J. C. RICHARDS.
Corn Sheller.
No. 30,185.   Patented Sept. 25, 1860.
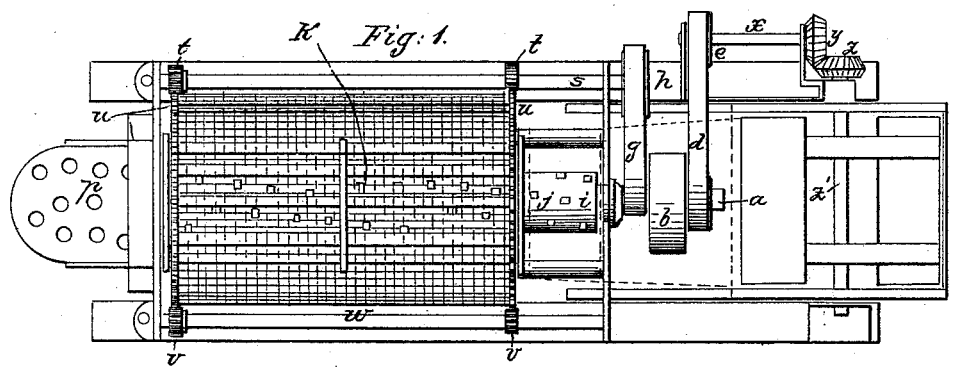
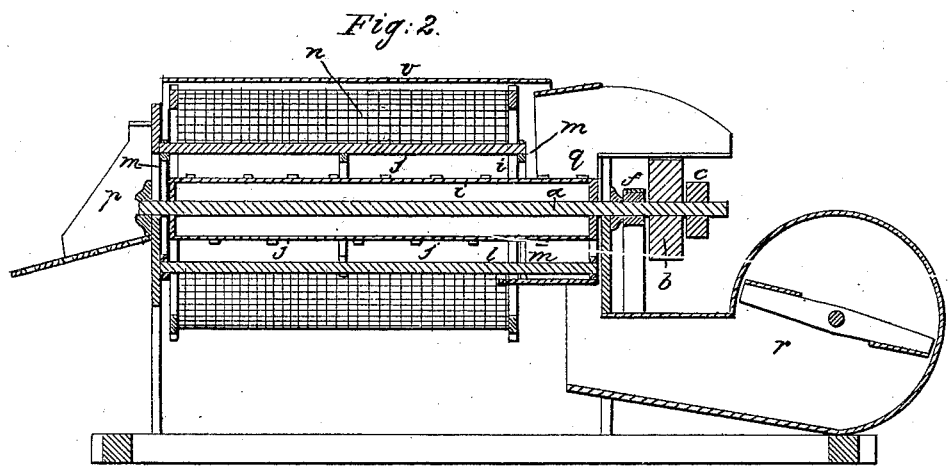
Witnesses:
T. T. Everett
C. Emerson
Inventor:
J. C. Richards

UNITED STATES PATENT OFFICE.

J. C. RICHARDS, OF LAFAYETTE, INDIANA, ASSIGNOR TO HIMSELF, J. HUBLER, AND R. M. McGRATH, OF SAME PLACE.

CORN SHELLER AND CLEANER.

Specification of Letters Patent No. 30,185, dated September 25, 1860.

*To all whom it may concern:*

Be it known that I, J. C. RICHARDS, of the town of Lafayette, in the county of Tippecanoe and State of Indiana, have invented certain new and useful Improvements on Corn Shellers and Cleaners; and I do hereby declare the following to be a full, clear, and exact description of the same, reference being had to the accompanying drawings and to the letters and marks therein.

My invention has for its objects the removing of the corn from the cob in unbroken kernels and the so cleaning of it as to have it in a condition for the mill.

By Figure 1 of the drawings forming part of this specification is shown a top view of a sheller and cleaner having my improvements, the covering being removed in order to exhibit the interior parts, and by Fig. 2 a longitudinal sectional view of the same, like letters representing like parts in both figures.

This sheller and cleaner is made up of a central main shaft ($a$), having upon it a drum ($b$) for a band from a driving or power-shaft, a pulley ($c$), for a band or cord ($d$) to communicate motion to a side pulley ($e$), another pulley ($f$) to give place for another band or cord ($g$) for moving another pulley ($h$), and a cylinder ($i$) to which the teeth ($j$) for operating on the corn on the cob are affixed. In the place of the cylinder ($i$) on the shaft, the shaft may be solid to the extent of the cylinder's diameter, and if made of cast iron the teeth may be cast with the shaft. The following parts also come into the construction of this sheller and cleaner—a sheller cylinder ($k$) composed of rods ($l$) inserted through holes in the rings ($m, m$)—a screen cylinder ($n$), surrounding the rod cylinder,—a covering ($o$)—a chute for the cobs ($p$)—a hopper ($q$)—and a fan-blower ($r$).

Corn shellers are usually so constructed that the ear of corn lies between two rigid surfaces one or both having teeth and one or both movable on an axis, and only a small portion of one of such surfaces is open for the escape of the shelled corn. Such shellers generally, too, have only one exit for both corn and cob. In shellers so constructed the ears frequently become jammed, the shelled grains broken and when delivered from the sheller the corn, cob, and dirt are all in a mixed mass. The jamming of the ears retards the action of the sheller.

Now by my sheller and cleaner no jamming occurs, the kernels are not broken, the cob is delivered at one point and the corn at another, while the corn is freely and fully exposed to a current of air and the dirt and chaff or small fragments are driven out of the machine away from both corn and cob, and by virtue of its construction and arrangement of parts it will shell a greater quantity of ears within a given time than any sheller known to me and will deliver the corn perfect in its kernels and entirely clean.

It will be perceived that the cylinder ($k$), surrounding the toothed cylinder ($i$), is made up of rods, there being spaces between the rods, throughout the entire circumference of the cylinder, for the escape of the corn. These rods are not secured at their end to the rings ($m, m$) but only fit into holes therein so that when a grain or kernel of corn becomes tightened between a tooth and the rod the rod will rotate and thus the kernel will escape in a sound and unbroken condition.

From the description here given and from the figures of the drawings the operation of my sheller and cleaner will readily be understood to be thus: The ears of corn being placed in the hopper ($q$) readily pass into the space between the cylinders ($i$) and ($k$), the rotation of the drum ($b$) by a band from a power shaft gives rotation to the cylinder ($i$), the kernels being removed from the cob pass out by or through the spaces between the rods while the cobs are carried along by the helical arrangement of the teeth and are delivered to the chute ($p$). The kernels of corn fall within the cleaning cylinder ($u$) the dirt being blown through the end of the screen and the kernels passing through the spaces of the cylinder, and thus the cleaned corn will be delivered into any receptacle or trough for the conveyance of it wherever desired. While in the cylinder the corn is subjected to agitation by the rotation of the cleaner, and the entire spaces in the sheller and cleaner being exposed to the current of air their contents are necessarily acted upon by the blast and the cleaning thereby effected. The cleaner has rotation in direction opposite to that of the toothed cylinder, the band $(g)$ giving motion to the pulley $(h)$ the shaft $(s)$ of which by its pinion $(t)$, fitting into the toothed ends $(u)$ of the cleaner cylinder, both support the cylinder on the one side and move it, while pinions $(v)$ upon a shaft $(w)$ sustains it on the other side. Shafts $(s)$ and $(w)$ have their ends supported in suitable bearings in the frame of the machine. The fan-blower derives its motion from the pulley $(c)$, through band $(d)$, pulley $(e)$, shaft $(x)$, pinions $(y)$ and $(z)$, the latter named being on the end of the blower's shaft $(z')$.

It will be understood that each of the parts herein named are supported by suitable bearings in the frame work of the machine and that a sufficient number of the rods of the cylinder $(k)$ are secured to the ends or rings of that cylinder to give it form and strength.

What I claim as my invention and desire to secure by Letters Patent is—

1. The cylinder $(k)$ made up of rods and arranged in relation to the revolving screen and operated as herein set forth.

2. The arrangement of the toothed cylinder $(i)$ within the rod cylinder $k$, and revolving screen cylinder $n$ with the hopper at the one end and the cob-chute at the other end, the corn being delivered through the rod cylinder to the screen, the cobs being conveyed to the chute by the helical arrangement of the teeth, as described.

3. The revolving screen or cleaner $(n)$ in combination with a sheller, composed of the toothed cylinder and rod cylinder or its equivalents, said cleaner rotating around the whole length of the sheller and the entire surfaces of both sheller and cleaner being operative surfaces as set forth.

J. C. RICHARDS.

Witnesses:
T. T. EVERETT,
W. THOMPSON.